(12) United States Patent
Ushijima et al.

(10) Patent No.: US 11,852,611 B2
(45) Date of Patent: *Dec. 26, 2023

(54) INSPECTION SYSTEM, CONTROL UNIT, CONTROL METHOD, AND STORAGE MEDIUM

(71) Applicant: Kabushiki Kaisha Toshiba, Tokyo (JP)

(72) Inventors: Akira Ushijima, Yokohama (JP); Masahiro Saito, Yokohama (JP); Yasunori Chiba, Yokohama (JP); Shin Matsumoto, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 12 days.

This patent is subject to a terminal disclaimer.

(21) Appl. No.: 17/446,548

(22) Filed: Aug. 31, 2021

(65) Prior Publication Data

US 2021/0389279 A1 Dec. 16, 2021

Related U.S. Application Data

(60) Division of application No. 16/567,004, filed on Sep. 11, 2019, now Pat. No. 11,131,652, which is a
(Continued)

(30) Foreign Application Priority Data

Nov. 15, 2017 (JP) .................................. 2017-220461

(51) Int. Cl.
*G01N 29/265* (2006.01)
*G01N 29/22* (2006.01)

(52) U.S. Cl.
CPC ......... *G01N 29/265* (2013.01); *G01N 29/225* (2013.01); *G01N 2291/0289* (2013.01);
(Continued)

(58) Field of Classification Search
CPC .... G01N 29/265; G01N 29/225; G01N 29/07; G01N 29/32; G01N 29/043;
(Continued)

(56) References Cited

U.S. PATENT DOCUMENTS

| 3,678,736 A | 7/1972 | May |
| 9,733,219 B2 | 8/2017 | Spencer |

(Continued)

FOREIGN PATENT DOCUMENTS

| JP | 2006-153710 A | 6/2006 |
| JP | 2006-220608 A | 8/2006 |

(Continued)

*Primary Examiner* — Jacques M Saint Surin
(74) *Attorney, Agent, or Firm* — Oblon, McClelland, Maier & Neustadt, L.L.P.

(57) ABSTRACT

According to one embodiment, an inspection system includes a probe and a controller. The probe includes a plurality of ultrasonic sensors arranged in a first direction. The probe contacts a weld portion by moving in a second direction crossing the first direction. Each of the plurality of ultrasonic sensors transmits an ultrasonic wave toward the weld portion and receives a reflected wave. The controller detects a joint and a non-joint at a plurality of points along the first direction of the weld portion based on the plurality of reflected waves. The controller adjusts an angle of the probe around a third direction based on a number of the joints or the non-joints detected for the plurality of points. The third direction is perpendicular to the first direction and crosses the second direction.

15 Claims, 11 Drawing Sheets

Related U.S. Application Data continuation of application No. PCT/JP2018/042113, filed on Nov. 14, 2018.

(52) U.S. Cl.
CPC ............. *G01N 2291/106* (2013.01); *G01N 2291/2672* (2013.01)

(58) Field of Classification Search
CPC ..... G01N 2291/0234; G01N 2291/105; G01N 29/22; G01N 2291/0289; G01N 2291/2672; G01N 2291/106; G01N 2291/044; G01N 2291/011; G01B 17/00
USPC .......................................................... 73/588
See application file for complete search history.

(56) References Cited

U.S. PATENT DOCUMENTS

| | | | |
|---|---|---|---|
| 10,036,731 B2 | 7/2018 | Edwards, II | |
| 10,113,993 B2 | 10/2018 | Spencer | |
| 11,131,652 B2 * | 9/2021 | Ushijima | ............ G01B 17/00 |
| 2004/0245315 A1 | 12/2004 | Maev et al. | |
| 2005/0126293 A1 | 6/2005 | Dasch | |
| 2007/0282543 A1 | 12/2007 | Hiyama et al. | |
| 2008/0210009 A1 | 9/2008 | Tanishiki | |
| 2009/0178482 A1 | 7/2009 | Hough et al. | |
| 2010/0031750 A1 | 2/2010 | Spencer et al. | |
| 2011/0000299 A1 | 1/2011 | Isobe et al. | |
| 2011/0102429 A1 | 5/2011 | Matsumoto et al. | |
| 2012/0243771 A1 | 9/2012 | Matsumoto et al. | |
| 2016/0320344 A1 | 11/2016 | Spencer et al. | |
| 2020/0363377 A1 | 11/2020 | Saito | |

FOREIGN PATENT DOCUMENTS

| | | |
|---|---|---|
| JP | 2007-278809 A | 10/2007 |
| JP | 2008-51645 A | 3/2008 |
| JP | 2008-203082 A | 9/2008 |
| JP | 2010-014626 A | 1/2010 |
| JP | 4837425 B2 | 12/2011 |
| JP | 2012-247262 A | 12/2012 |
| JP | 3189500 U | 3/2014 |
| JP | 5618529 B2 | 11/2014 |
| JP | 6570600 B2 | 9/2019 |
| KR | 10-2008-0072923 A | 8/2008 |
| WO | WO 2016/164457 A1 | 10/2016 |

* cited by examiner

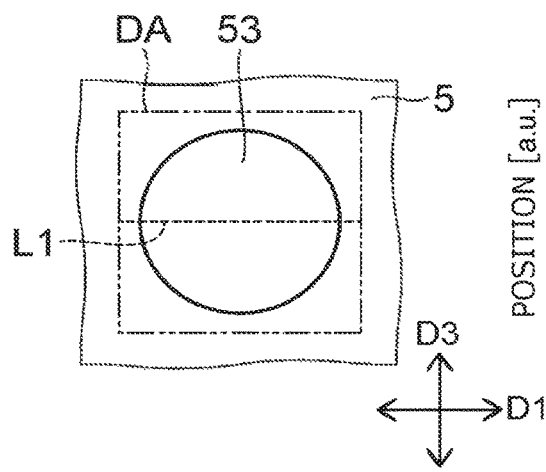
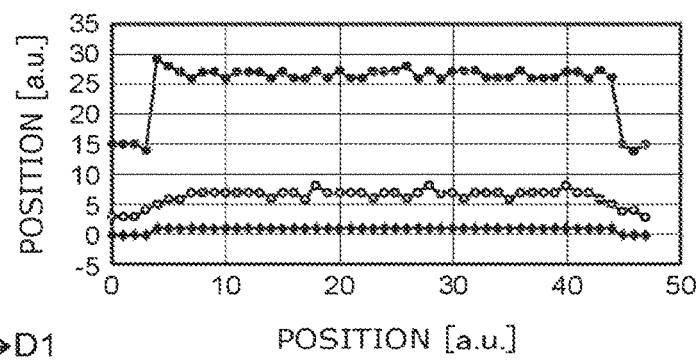
FIG. 7A  FIG. 7B
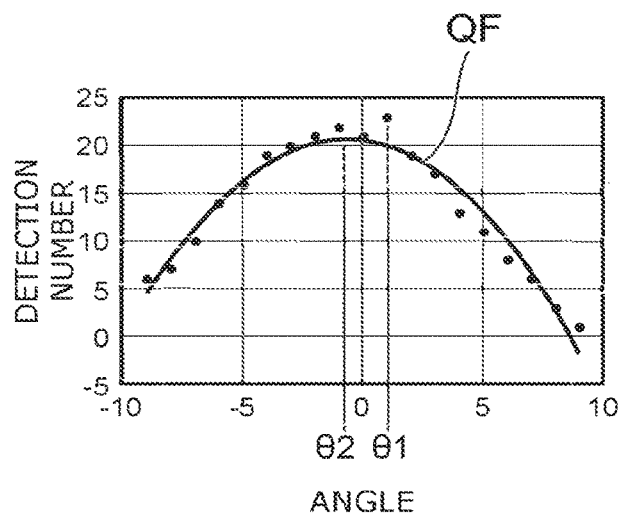
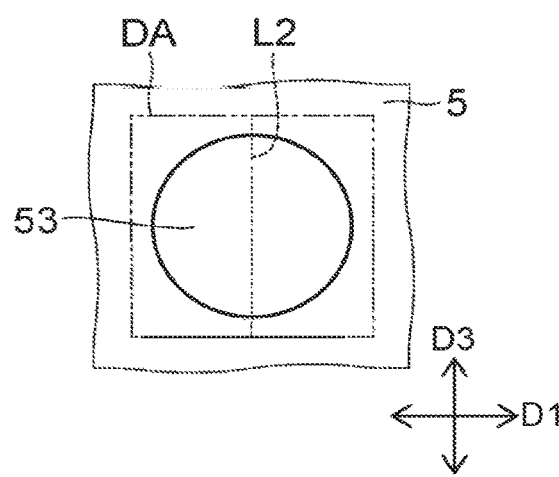
FIG. 7C  FIG. 7D

INSPECTION SYSTEM, CONTROL UNIT, CONTROL METHOD, AND STORAGE MEDIUM

CROSS-REFERENCE TO RELATED APPLICATIONS

This is a divisional application of U.S. application Ser. No. 16/567,004 filed Sep. 11, 2019 which is a continuation application of International Application PCT/JP2018/042113, filed on Nov. 14, 2018. This application also claims priority to Japanese Patent Application No. 2017-220461, filed on Nov. 15, 2017. The entire contents of each are incorporated herein by reference.

FIELD

Embodiments described herein relate generally to an inspection system, a control unit, a control method, and a storage medium.

BACKGROUND

In welding, one member is made by joining portions of two or more components to each other by melting. The member that is made by welding is inspected for whether or not the welded portion (hereinbelow, called the weld portion) is joined appropriately. For example, in a non-destructive inspection, a probe that includes ultrasonic sensors is caused to contact the weld portion. Then, an ultrasonic wave is transmitted toward the weld portion; and the existence or absence of the joint is verified based on the reflected wave.

In the inspection, the angle of the probe with respect to the member affects the inspection result. For example, when the inspection is performed at an inappropriate angle, there is a possibility that an incomplete weld may be determined despite actually being joined appropriately. Therefore, it is desirable for the angle of the probe to be set to an appropriate value. In particular, it is desirable to develop technology so that the angle of the probe can be adjusted to a more appropriate value for an inspection apparatus in which multiple ultrasonic sensors are arranged.

BRIEF DESCRIPTION OF THE DRAWINGS

FIGS. 7A to 7D are figures for describing the inspection system according to the embodiment;

DETAILED DESCRIPTION

Figure 1:
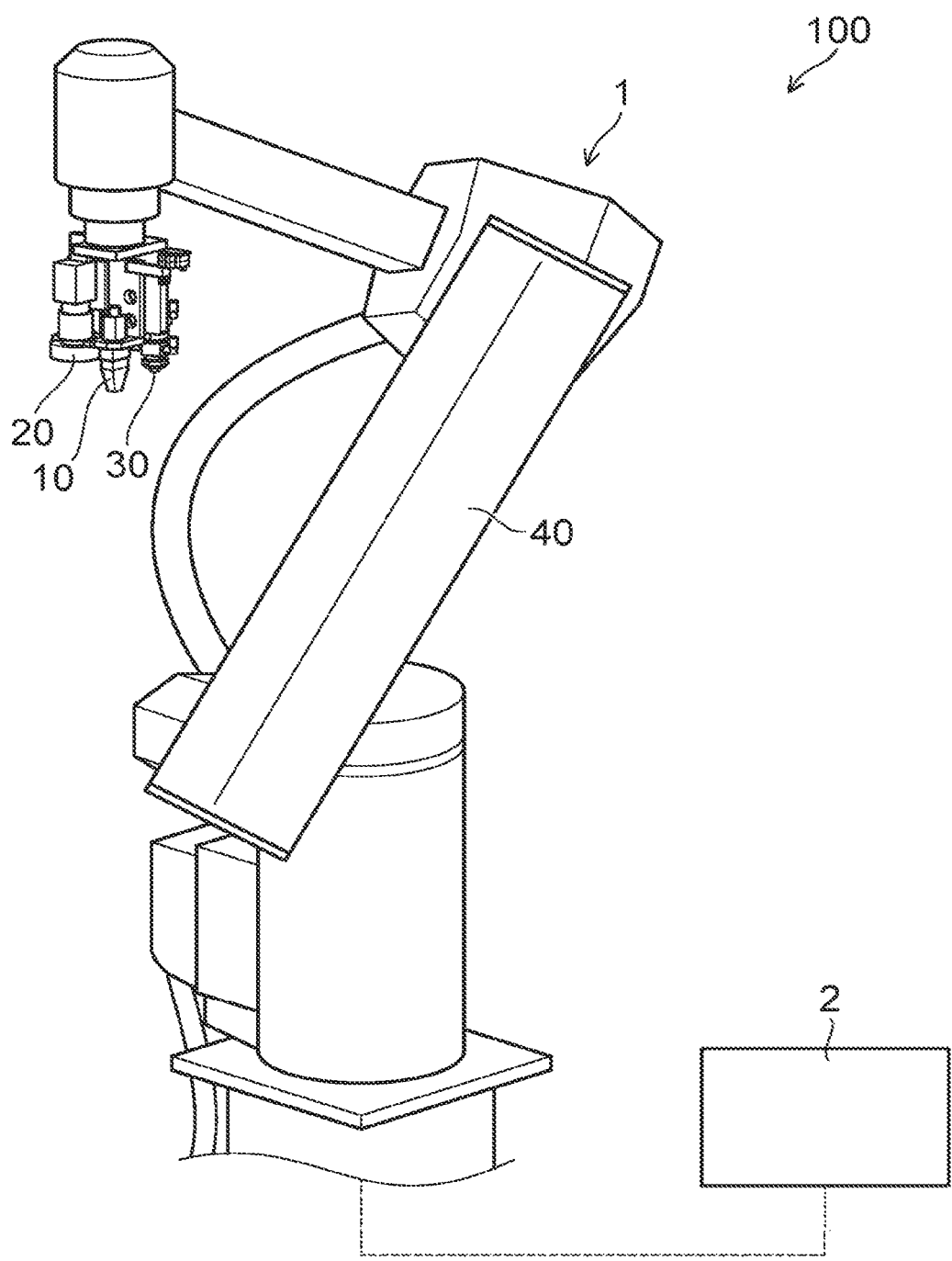
FIG. 1 is a schematic view illustrating an inspection system according to an embodiment.

According to one embodiment, an inspection system includes a probe and a controller. The probe includes a plurality of ultrasonic sensors arranged in a first direction. The probe contacts a weld portion by moving in a second direction crossing the first direction. Each of the plurality of ultrasonic sensors transmits an ultrasonic wave toward the weld portion and receives a reflected wave. The controller detects a joint and a non-joint at a plurality of points along the first direction of the weld portion based on the plurality of reflected waves. The controller adjusts an angle of the probe around a third direction based on a number of the joints or the non-joints detected for the plurality of points. The third direction is perpendicular to the first direction and crosses the second direction.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

FIG. 1 is a schematic view illustrating an inspection system according to an embodiment.

Figure 2:
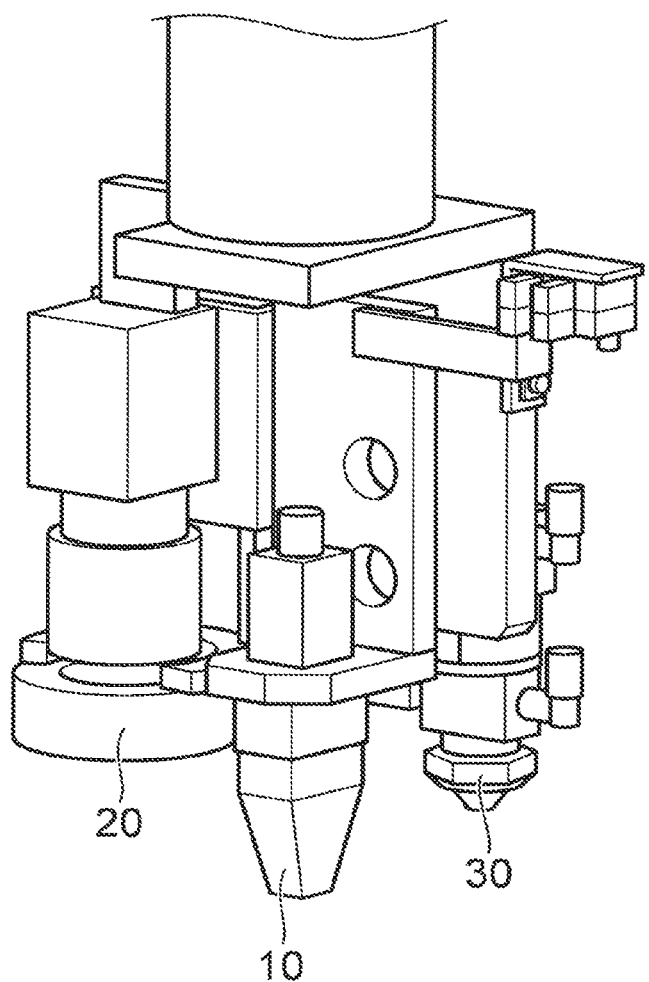
FIG. 2 is a perspective view illustrating a portion of the inspection system according to the embodiment.

FIG. 2 is a perspective view illustrating a portion of the inspection system according to the embodiment.

The inspection system 100 according to the embodiment is for a non-destructive inspection of a weld portion in which two or more components are formed as one body.

As illustrated in FIG. 1, the inspection system 100 according to the embodiment includes an inspection apparatus 1 and a controller 2. As illustrated in FIG. 2, the inspection apparatus 1 includes a probe 10, an imager 20, a coater 30, and a robot arm (hereinbelow, called the arm) 40.

The probe 10 includes multiple ultrasonic sensors used in the inspection of the weld portion. The imager 20 images the welded member and acquires an image. The imager 20 extracts the weld mark from the image and detects the position of the weld portion. The coater 30 coats a couplant onto the upper surface of the weld portion. The couplant is used to provide acoustic matching of the ultrasonic wave between the probe 10 and the inspection object. The couplant may be a liquid or a gel.

For example, the probe 10, the imager 20, and the coater 30 are provided at the tip of the arm 40 as illustrated in FIG. 2. The arm 40 is, for example, an articulated robot. The positions of the probe 10, the imager 20, and the coater 30 can be changed by driving the arm 40. The controller 2 controls the operations of these components included in the inspection apparatus 1.

For example, the inspection apparatus 1 is connected to a device including the controller 2 by wired communication or wireless communication. A control unit may include the controller 2. The control unit may include processing circuitry to perform various processes described here. Or, the inspection system 100 according to the embodiment may be realized by providing the controller 2 in the inspection apparatus 1.

Figure 3:
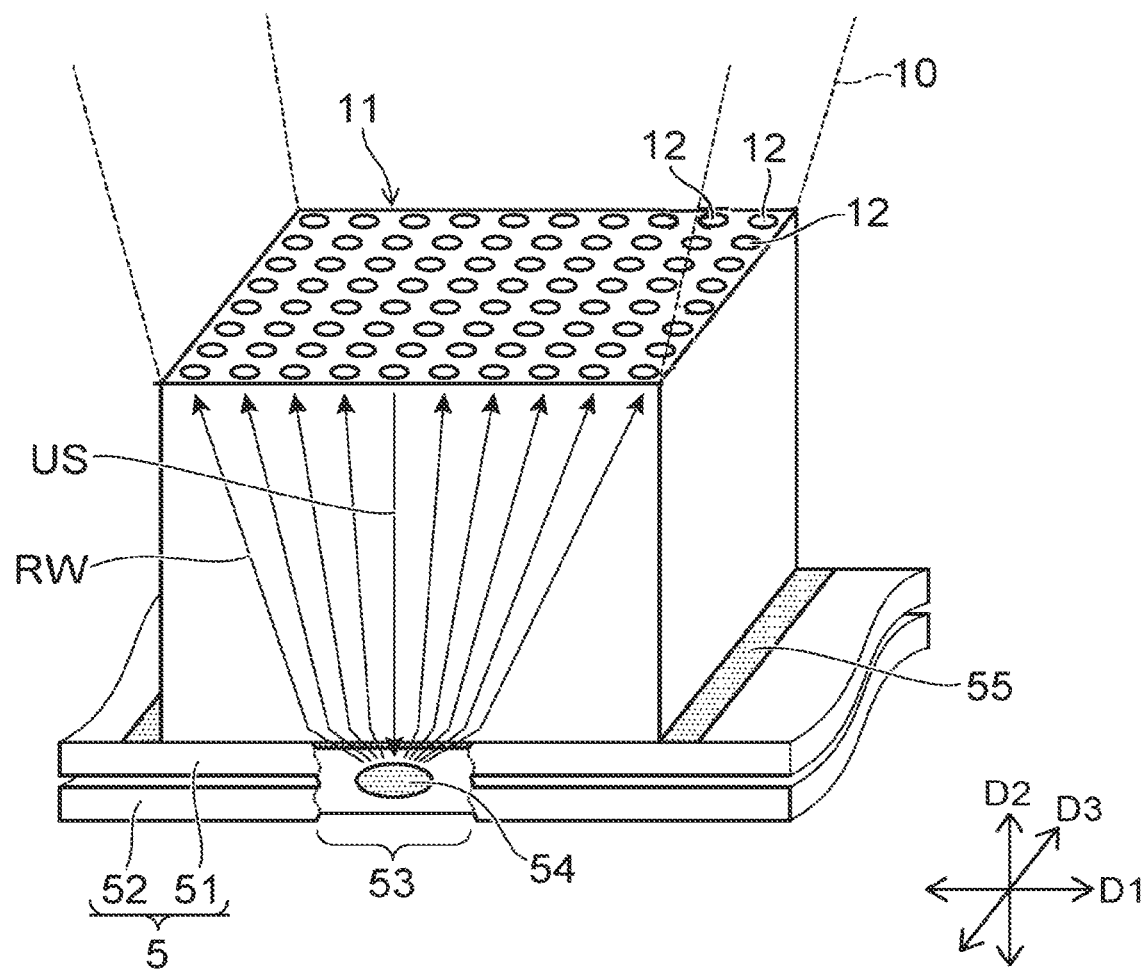
FIG. 3 is a schematic view illustrating the internal structure of the probe tip of the inspection system according to the embodiment.

FIG. 3 is a schematic view illustrating the internal structure of the probe tip of the inspection system according to the embodiment.

A matrix sensor 11 illustrated in FIG. 3 is provided in the interior of the probe 10 tip. The matrix sensor 11 includes multiple ultrasonic sensors 12. The ultrasonic sensors 12 are, for example, transducers. The multiple ultrasonic sensors 12 are arranged in a first direction D1 and a third direction D3 which are orthogonal to each other. The probe 10 contacts the inspection object by moving in a second direction D2 crossing a plane including the first direction D1 and the third direction D3. In the example of FIG. 3, the second direction D2 is perpendicular to the plane including the first direction D1 and the third direction D3.

FIG. 3 illustrates the state of inspecting a member 5. The member 5 is made by performing spot welding of a metal plate 51 and a metal plate 52 at a weld portion 53. A solidified portion 54 is formed at the weld portion 53 by melting, mixing, and solidifying a portion of the metal plate 51 and a portion of the metal plate 52. Each of the ultrasonic sensors 12 transmits an ultrasonic wave US toward the member 5 coated with a couplant 55 and receives a reflected wave RW from the member 5.

In one more specific example as illustrated in FIG. 3, one ultrasonic sensor 12 transmits the ultrasonic wave US toward the weld portion 53. A portion of the ultrasonic wave US is reflected by the front surface or the bottom surface of the member 5, etc. Each of the multiple ultrasonic sensors 12 receives and detects the reflected wave RW. The weld portion 53 vicinity of the member 5 is inspected two-dimensionally by the ultrasonic sensors 12 each sequentially transmitting the ultrasonic wave US and by the multiple ultrasonic sensors 12 receiving each of the reflected waves RW.

Figure 4:
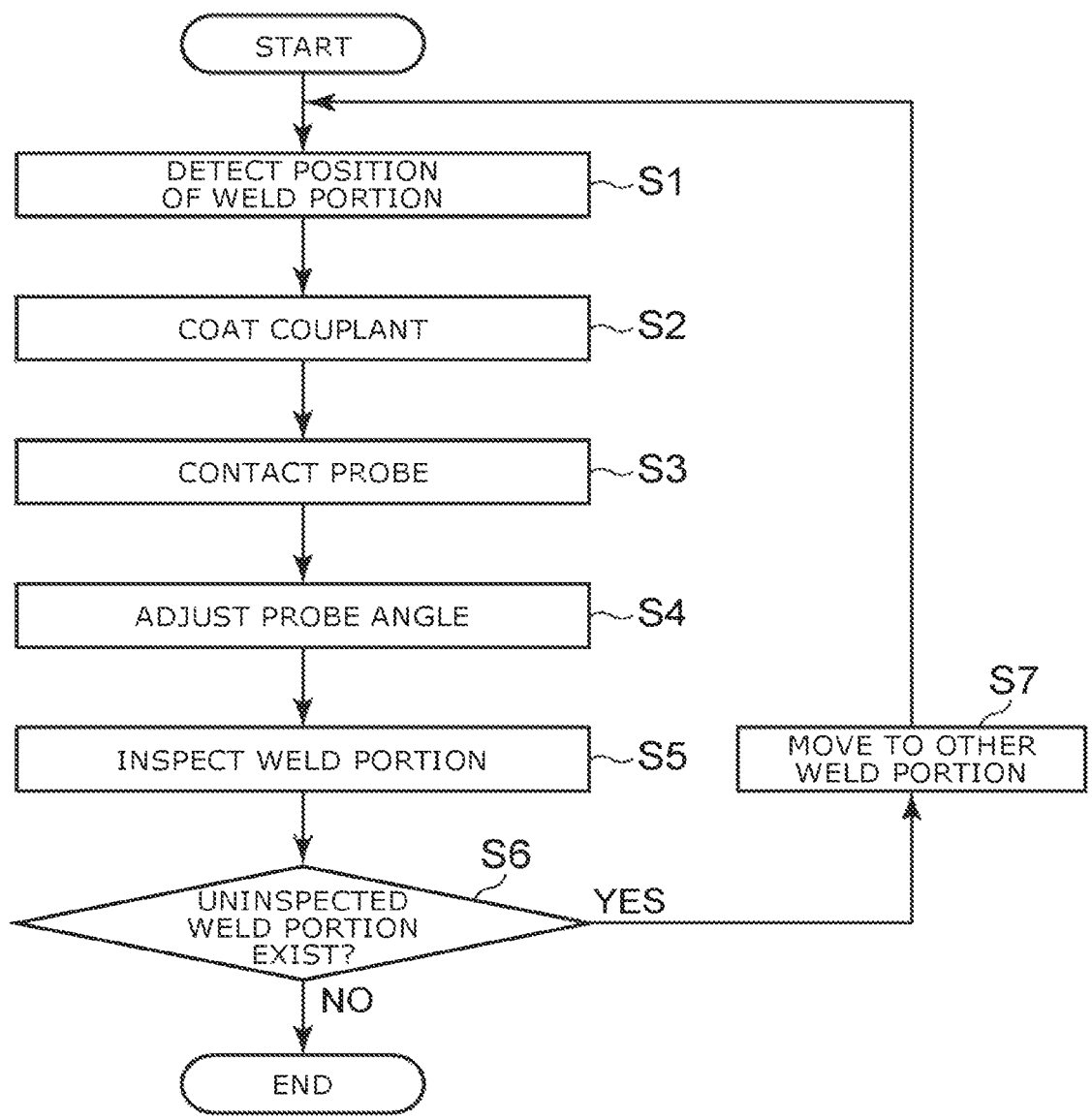
FIG. 4 is a flowchart illustrating an overview of the operation of the inspection system according to the embodiment.

FIG. 4 is a flowchart illustrating an overview of the operation of the inspection system according to the embodiment.

First, the imager 20 images the member 5 and detects the position of the weld portion 53 from the acquired image (step S1). The arm 40 moves the coater 30 to a position opposing the weld portion 53 in the second direction D2. The coater 30 coats the couplant onto the weld portion (step S2). The arm 40 moves the probe 10 in the second direction D2 and causes the probe 10 to contact the weld portion 53 (step S3).

In the state in which the probe 10 contacts the weld portion 53, the multiple ultrasonic sensors 12 transmit the ultrasonic waves US toward the member 5 including the weld portion 53 and receive the reflected waves RW. The controller 2 adjusts the angle of the probe 10 based on the multiple reflected waves RW (step S4). When the angle of the probe 10 has been adjusted, the weld portion 53 is inspected by the multiple ultrasonic sensors 12 (step S5). The controller 2 determines whether or not an uninspected weld portion 53 exists (step S6).

In the case where there is no uninspected weld portion 53, the inspection ends. In the case where an uninspected weld portion 53 exists, the controller 2 drives the arm 40 and moves the probe 10, the imager 20, and the coater 30 toward another weld portion 53 (step S7). Subsequently, steps S1 to S6 are performed again.

Figure 5A:
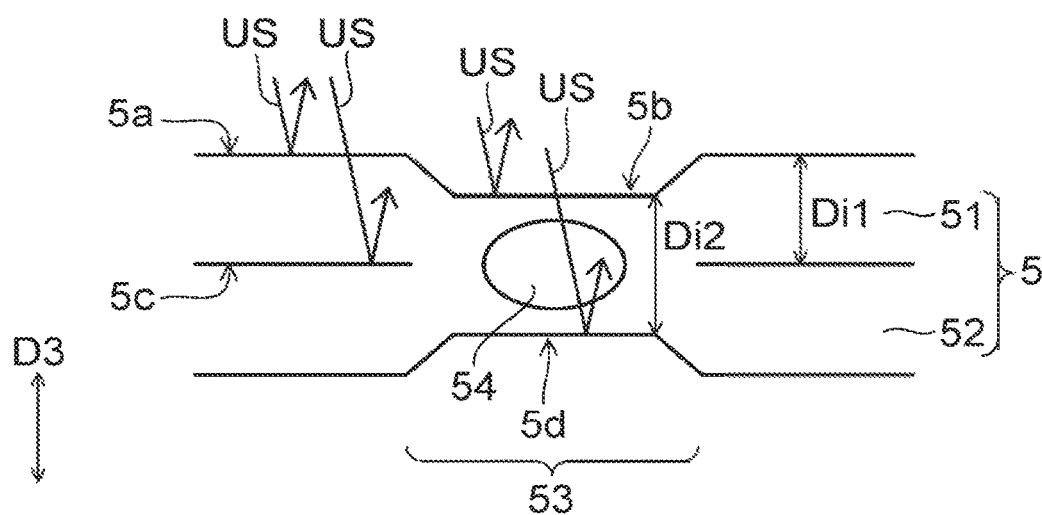
FIGS. 5A to 5C are schematic views for describing the inspection method using the inspection system according to the embodiment.
Figure 5B:
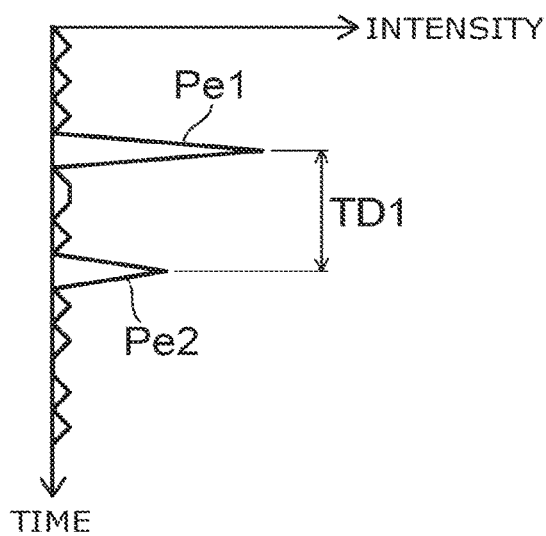
Figure 5C:
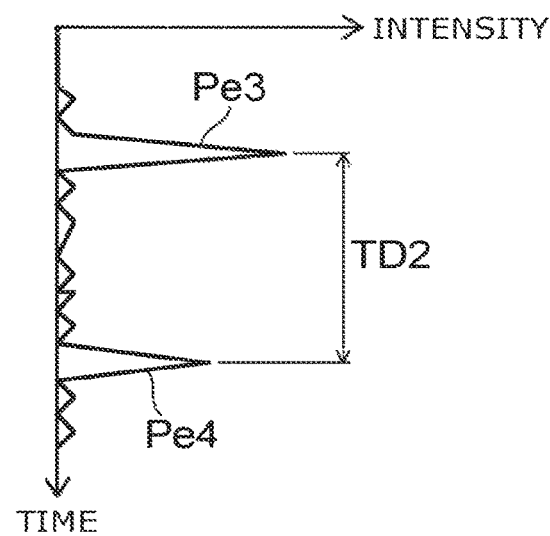

FIGS. 5A to 5C are schematic views for describing the inspection method using the inspection system according to the embodiment.

As illustrated in FIG. 5A, a portion of the ultrasonic wave US is reflected by an upper surface 5a of the metal plate 51 or an upper surface 5b of the weld portion 53. The other portion of the ultrasonic wave US enters the member 5 and is reflected by a bottom surface 5c of the metal plate 51 or a bottom surface 5d of the weld portion 53.

The positions in the second direction D2 of the upper surface 5a, the upper surface 5b, the bottom surface 5c, and the bottom surface 5d are different from each other. In other words, the distances in the second direction D2 between the ultrasonic sensor 12 and these surfaces are different from each other. The peak of the intensity of the reflected wave is detected when the ultrasonic sensor 12 receives the reflected waves from these surfaces. Which surface reflected the ultrasonic wave US can be verified by calculating the time until each peak is detected after transmitting the ultrasonic wave US.

FIG. 5B and FIG. 5C are graphs illustrating the relationship between the time after transmitting the ultrasonic wave US and the intensity of the reflected wave RW. The graph of FIG. 5B illustrates the reception result of the reflected waves RW from the upper surface 5a and the bottom surface 5c of the metal plate 51. The graph of FIG. 5C illustrates the reception result of the reflected waves RW from the upper surface 5b and the bottom surface 5d of the weld portion 53.

In the graph of FIG. 5B, a peak Pe1 occurring first is based on the reflected wave RW from the upper surface 5a. A peak Pe2 occurring second is based on the reflected wave RW from the bottom surface 5c. The times when the peak Pe1 and the peak Pe2 are detected correspond respectively to the positions in the second direction D2 of the upper surface 5a and the bottom surface 5c of the metal plate 51. A time difference TD1 between the time when the peak Pe1 is detected and the time when the peak Pe2 is detected corresponds to a distance Di1 in the second direction D2 between the upper surface 5a and the bottom surface 5c.

Similarly, in the graph of FIG. 5C, a peak Pe3 occurring first is based on the reflected wave RW from the upper surface 5b. A peak Pe4 occurring second is based on the reflected wave RW from the bottom surface 5d. The times when the peak Pe3 and the peak Pe4 are detected correspond respectively to the positions in the second direction D2 of the upper surface 5b and the bottom surface 5d of the weld portion 53. A time difference TD2 between the time when the peak Pe3 is detected and the time when the peak Pe4 is detected corresponds to a distance Di2 in the second direction D2 between the upper surface 5b and the bottom surface 5d.

Accordingly, the positions in the second direction D2 of the surfaces reflecting the ultrasonic wave US can be detected by detecting the time until detecting the peak occurring first (a first peak) and the peak occurring second (a second peak) of the reflected wave RW after transmitting the ultrasonic wave US. The distance in the second direction D2 between the surfaces reflecting the ultrasonic wave US can be detected from the difference between the time when the peak occurring first is detected and the time when the peak occurring second is detected.

The method for adjusting the angle performed in step S4 will now be described in detail.

Figure 6:
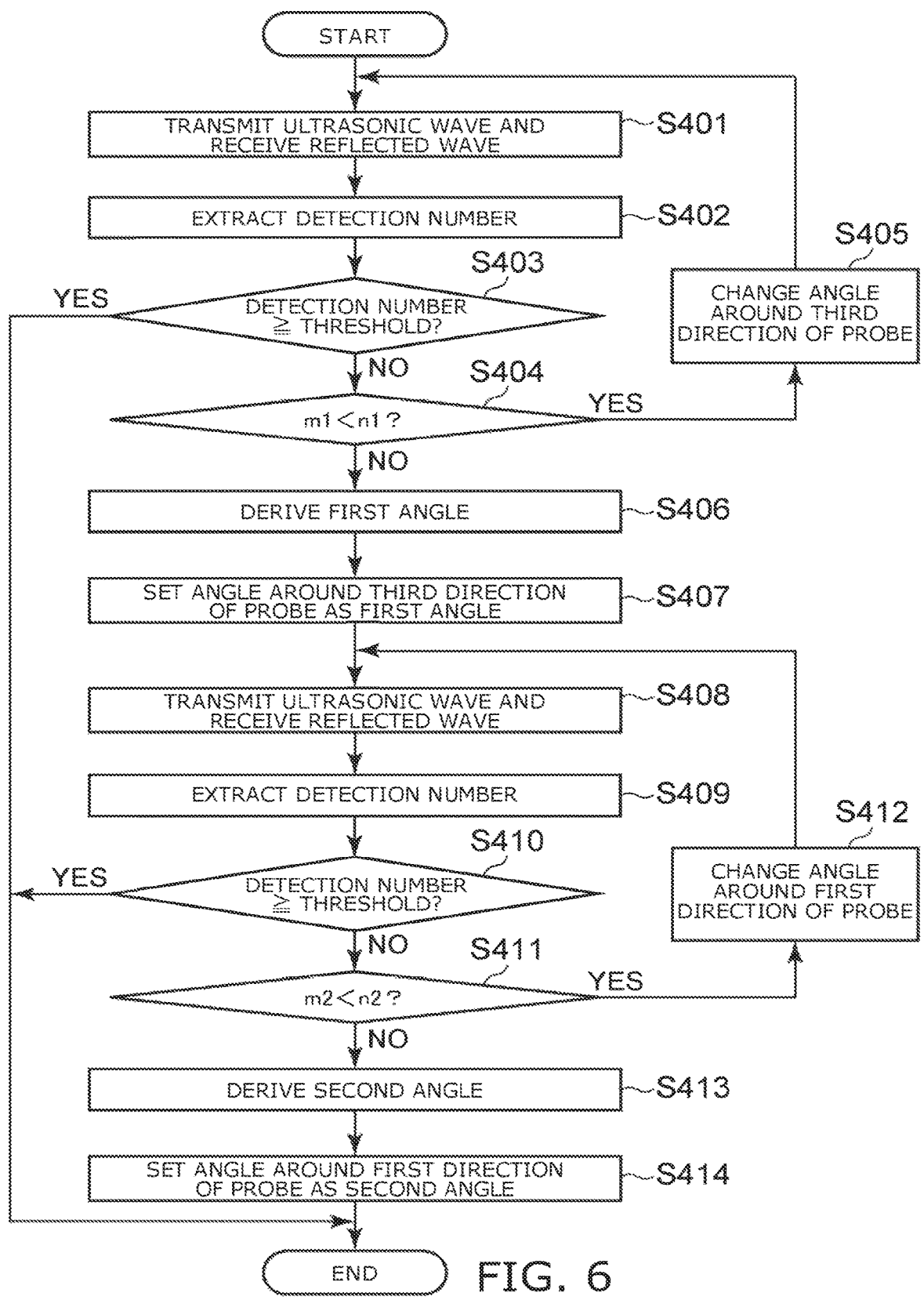
FIG. 6 is a flowchart illustrating the method for adjusting the probe angle using the inspection system according to the embodiment.

FIG. 6 is a flowchart illustrating the method for adjusting the probe angle using the inspection system according to the embodiment.

FIGS. 7A to 7D are figures for describing the inspection system according to the embodiment.

The ultrasonic waves US are transmitted from the multiple ultrasonic sensors 12; and the reflected waves RW are received (step S401). For example, as described in reference to FIG. 3, the ultrasonic sensors 12 each sequentially transmit the ultrasonic wave US; and the multiple ultrasonic sensors 12 receive each of the reflected waves RW.

FIG. 7A and FIG. 7D are plan views illustrating the weld portion 53 vicinity of the member 5. For example, the structure of a detection area DA illustrated in FIG. 7A is detected by step S401. In other words, a joint or a non-joint is detected for each point of the detection area DA. From the detection results, the controller 2 adjusts the angle around the third direction D3 of the probe 10 based on the detection result along a line segment L1 along the first direction D1. For example, the line segment L1 is positioned at the center vicinity in the third direction D3 of the detection area DA.

FIG. 7B is an example of the detection result at each point along the line segment L1. In FIG. 7B, the vertical axis is the position in the second direction D2. The horizontal axis is the position in the first direction D1. In FIG. 7B, ○ (the white circles) illustrate the position in the second direction D2 of the first reflective surface (the first reflective surface) of the member 5. In other words, ○ illustrate the position of the upper surface 5a or the position of the upper surface 5b. ● (the black circles) illustrate the position in the second direction D2 of the second reflective surface (the second reflective surface) of the member 5. In other words, a illustrate the position of the bottom surface 5c or the position of the bottom surface 5d. As described above, these positions are calculated based on the time until the peak of the reflected wave RW is detected after transmitting the ultrasonic wave US. ♦ illustrate the detection result of the joint and the non-joint described below.

In the result of FIG. 7B, the distance between the first reflective surface and the second reflective surface is short in the detection result at the end vicinities in the first direction D1 of the line segment L1. This shows that the ultrasonic wave US is reflected by the upper surface 5a and the bottom surface 5c. The distance between the first reflective surface and the second reflective surface is long in the detection result at the center in the first direction D1. This shows that the ultrasonic wave US is reflected by the upper surface 5b and the bottom surface 5d.

The controller 2 calculates the distance between the first reflective surface and the second reflective surface. For example, in the case where the distance is not less than a preset threshold, the controller 2 determines that the point is joined. In the case where the distance is less than the threshold, the controller 2 determines that the point is not joined. In the graph illustrated in FIG. 7B, the points that are determined to be joined are illustrated by the value of 1; and the points determined not to be joined are illustrated by the value of 0.

By the method described above, the controller 2 detects the joint and the non-joint at the multiple points along the first direction D1 of the member 5. The controller 2 extracts the number of times the joint is detected (hereinbelow, called the detection number) (step S402). The controller 2 determines whether or not the detection number is not less than a preset threshold (step S403). The threshold is set based on the dimension in the first direction D1 of the weld portion 53, the density of the ultrasonic sensors 12 in the first direction D1, etc.

In the case where the detection number is not less than the threshold, the controller 2 maintains the angle around the third direction D3 of the probe 10 and ends the angle adjustment. In such a case, step S5 illustrated in FIG. 4 may be omitted. This is because a sufficient detection number already has been detected; and the weld portion 53 can be considered to be joined appropriately. In the case where the detection number is less than the threshold, the controller 2 compares a number of times m1 that steps S401 and S402 have been performed to a preset value n1 (step S404).

In the case where the number of times m1 is less than the value n1, the controller 2 changes the angle around the third direction D3 of the probe 10 (step S405). Then, step S401 is re-performed. Thereby, step S401 and step S402 are performed repeatedly while changing the angle around the third direction D3. In the case where the number of times m1 is not less than the value n1, the controller 2 derives the appropriate first angle around the third direction D3 of the probe 10 from the detection result up to that time (step S406).

FIG. 7C illustrates an example of the detection result obtained by repeating steps S401 to S405. In FIG. 7C, the horizontal axis is the angle around the third direction D3; and the vertical axis is the detection number at each angle. For example, the controller 2 sets an angle θ1 having the highest detection number as the first angle. Or, the controller 2 may generate a quadratic function QF of the relationship between the angle and the detection number and set an angle θ2 where the quadratic function QF has a flexion point as the first angle. The controller 2 sets the angle around the third direction D3 of the probe 10 as the first angle (step S407).

Then, the ultrasonic waves US are transmitted from the multiple ultrasonic sensors 12; and the reflected waves RW are received (step S408). For example, similarly to step S401, the ultrasonic sensors 12 each sequentially transmit the ultrasonic wave US; and the multiple ultrasonic sensors 12 receive each of the reflected waves RW.

The structure of the detection area DA is detected by step S408. The controller 2 adjusts the angle around the first direction D1 of the probe 10 based on the detection result along a line segment L2 along the third direction D3 illustrated in FIG. 7D. For example, the line segment L2 is positioned at the center vicinity in the first direction D1 of the detection area DA.

Similarly to step S402, the controller 2 extracts the detection number for the multiple points along the third direction D3 of the member 5 (step S409). The controller 2 determines whether or not the detection number is not less than the preset threshold (step S410). The threshold is set based on the dimension in the third direction D3 of the weld portion 53, the density of the ultrasonic sensors 12 in the third direction D3, etc.

In the case where the detection number is not less than the threshold, the controller 2 maintains the angle around the first direction D1 of the probe 10 and ends the angle adjustment. In the case where the detection number is less than the threshold, the controller 2 compares a number of times m2 that steps S408 and S409 have been performed to a preset value n2 (step S411).

In the case where the number of times m2 is less than the value n2, the controller 2 changes the angle around the first direction D1 of the probe 10 (step S412). Then, steps S408 to S410 are re-performed.

In the case where the number of times m2 is not less than the value n2, the controller 2 derives the appropriate second angle around the first direction D1 of the probe 10 from the detection result up to that time (step S413). The derivation of the second angle is performed similarly to the method of step S406. The controller 2 sets the angle around the first direction D1 of the probe 10 as the second angle (step S414).

By the method described above, the angle of the probe 10 is adjusted appropriately; subsequently, the inspection of the weld portion 53 is performed by the probe 10.

The case where the number of times m2 is not less than the value n2 in step S411 shows that many points of the non-joint exist in the weld portion 53. This is because a sufficient detection number is not obtained in the previous steps even though the detection was performed while changing the angle of the probe 10. Accordingly, in the case where the number of times m2 is not less than the value n2 in step S411, the weld portion 53 may be determined to be a non-joint. In such a case, the angle adjustment ends; and step S5 illustrated in FIG. 4 is omitted.

In the method described above, the angle of the probe 10 is adjusted using, from the detection results of all of the ultrasonic sensors 12 included in the matrix sensor 11, the detection result along the line segment L1 along the first direction D1 and the detection result along a line segment L3 along the third direction D3.

The control method of the angle adjustment of the inspection system 100 according to the embodiment is not limited thereto. For example, the detection of the joint and the non-joint at the multiple points along the first direction D1 of the member 5 may be performed using only a portion of the multiple ultrasonic sensors 12 along the first direction D1. Similarly, the detection of the joint and the non-joint at the multiple points along the third direction D3 of the member 5 may be performed using only a portion of the multiple ultrasonic sensors 12 along the third direction D3. The specific detection method of the inspection system 100 according to the embodiment is modifiable as appropriate as long as the detection result of the joint and the non-joint at multiple points along a designated direction is obtained. This is similar for the control method of the angle adjustment described below as well.

Figure 8:
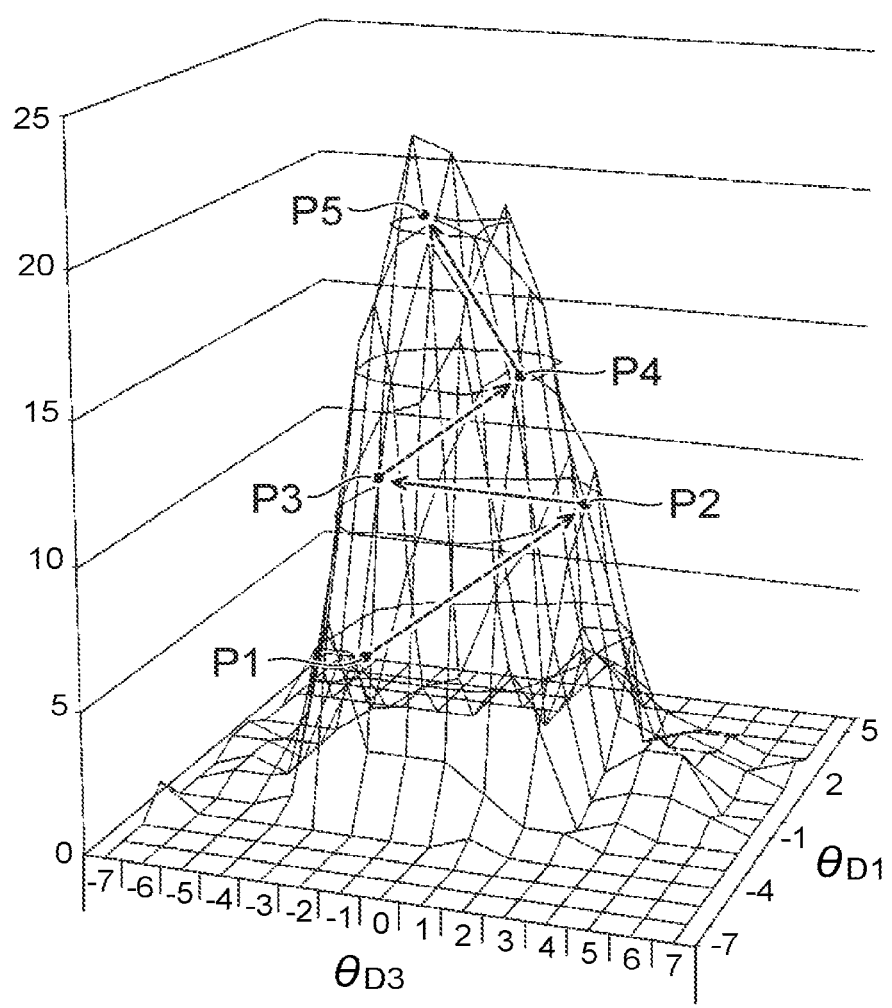
FIG. 8 is a figure for describing effects of the inspection system according to the embodiment.

FIG. 8 is a figure for describing effects of the inspection system according to the embodiment.

In FIG. 8, the two horizontal axes are respectively an angle $\theta_{D1}$ around the first direction D1 and an angle $\theta_{D3}$ around the third direction D3. The vertical axis is the detection number. Points P1 to P5 of FIG. 8 illustrate the path of the changes of the detection number when the angle $\theta_{D1}$ and the angle $\theta_{D3}$ are changed.

The method for adjusting the angle described above realizes an increase of the detection number while changing the angle $\theta_{D1}$ around the first direction D1 and the angle $\theta_{D3}$ around the third direction D3. As illustrated by the points P1 to P5 of FIG. 8, this method corresponds to climbing the hill of the detection number toward a higher position. A larger detection number shows that the member 5 can be inspected using a more appropriate angle.

In the example described above, the angle around the first direction D1 or around the third direction D3 is adjusted based on the number of times the joint is detected for the multiple points along the first direction D1 or the third direction D3 of the member 5. The inspection system 100 and the control method according to the embodiment are not limited to the example. The angle around the first direction D1 or around the third direction D3 may be adjusted based on the number of times the non-joint is detected for the multiple points along the first direction D1 or the third direction D3 of the member 5. In such a case, the angle around the first direction D1 or around the third direction D3 is adjusted to reduce the number of times the non-joint is detected. Similarly, for other methods described below, the angle of the probe 10 may be adjusted using the number of times the non-joint is detected instead of the number of times the joint is detected.

Effects of the embodiment will now be described.

In the inspection system 100 according to the embodiment as described above, the joint and the non-joint are detected at the multiple points along the first direction D1 of the weld portion 53. Then, the angle of the probe 10 around the third direction D3 is adjusted based on the number of the joints or the non-joints detected for these multiple points. The inventors discovered that the angle around the third direction D3 of the probe 10 can be adjusted to a more appropriate value by using this method. In other words, according to the embodiment, for a probe in which multiple ultrasonic sensors are arranged, the angle of the probe can be adjusted to a more appropriate value.

For example, the controller 2 extracts the detection number at each angle while changing the angle around the third direction D3 of the probe 10. Then, the controller 2 sets the first angle at which the detection number exceeds the preset threshold as the angle around the third direction D3 of the probe 10. According to this method, the range of angles for which the detection number is verified can be narrow; and a more appropriate angle around the third direction D3 can be detected in a shorter period of time.

Or, as illustrated in FIG. 7C, while changing the angle around the third direction D3 of the probe 10 within the first range, the controller 2 may set the first angle having the highest detection number as the angle around the third direction D3 of the probe 10. Or, the controller 2 may generate a quadratic function of the relationship between the angle and the detection number while changing the angle around the third direction D3 of the probe 10 within the first range. The controller 2 sets the first angle where the quadratic function has a flexion point as the angle around the third direction D3 of the probe 10.

The first range is set according to the precision necessary for the inspection of the weld portion 53. Typically, it is easier to set a more appropriate angle as the first range increases. According to these methods, a more appropriate angle around the third direction D3 can be detected.

Or, even when the detection count is low within the first range, by generating an approximate curve of the quadratic function, the first angle for which the value of the detection number is estimated to be large can be determined efficiently based on the quadratic function.

According to any of these methods, it is favorable to set the angle around the first direction D1 of the probe 10 after setting the angle around the third direction D3 of the probe 10. For example, similarly to the angle around the third direction D3, the controller 2 extracts the detection number at each angle while changing the angle around the first direction D1 of the probe 10. The controller 2 sets the angle where the detection number exceeds the preset threshold as the angle around the third direction D3 of the probe 10.

Or, the controller 2 may set the angle having the highest detection number as the angle around the third direction D3 of the probe 10. Or, the controller 2 may generate a quadratic function of the relationship between the angle and the detection number and set the angle where the quadratic function has a flexion point as the angle around the third direction D3 of the probe 10.

Thereby, the angle around the first direction D1 of the probe 10 and the angle around the third direction D3 are adjusted to more appropriate values. By inspecting the weld portion 53 in a state in which the angle of the probe 10 is adjusted, it is possible to inspect the weld portion 53 more accurately.

In the inspection system according to the embodiment, the angle adjustment may be performed by the following methods.

Figure 9A:
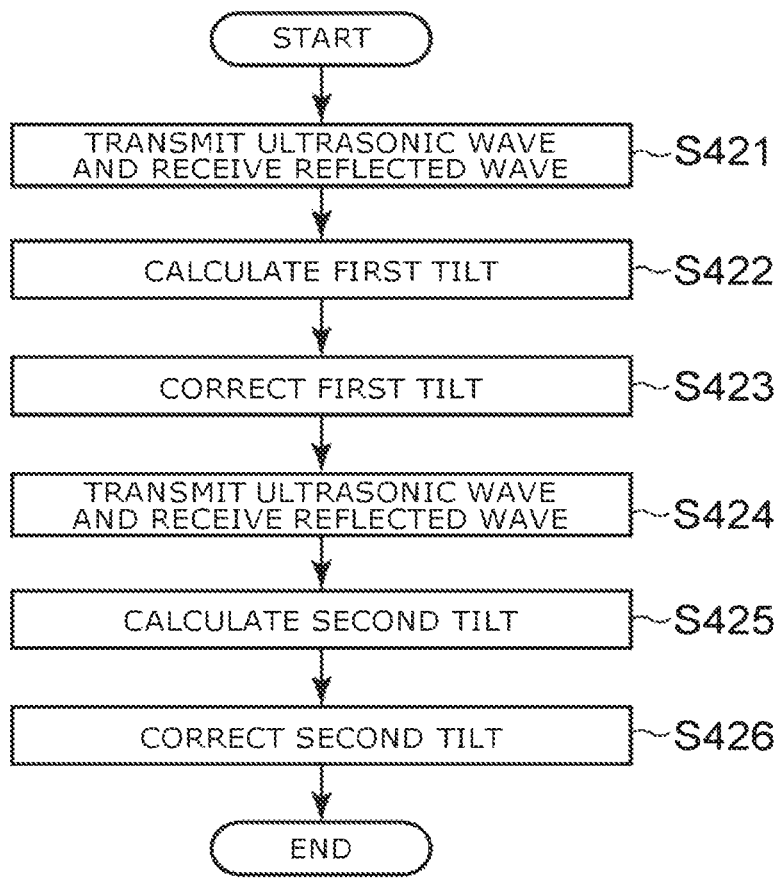
FIGS. 9A and 9B are flowcharts illustrating another method for adjusting the probe angle using the inspection system according to the embodiment.
Figure 9B:
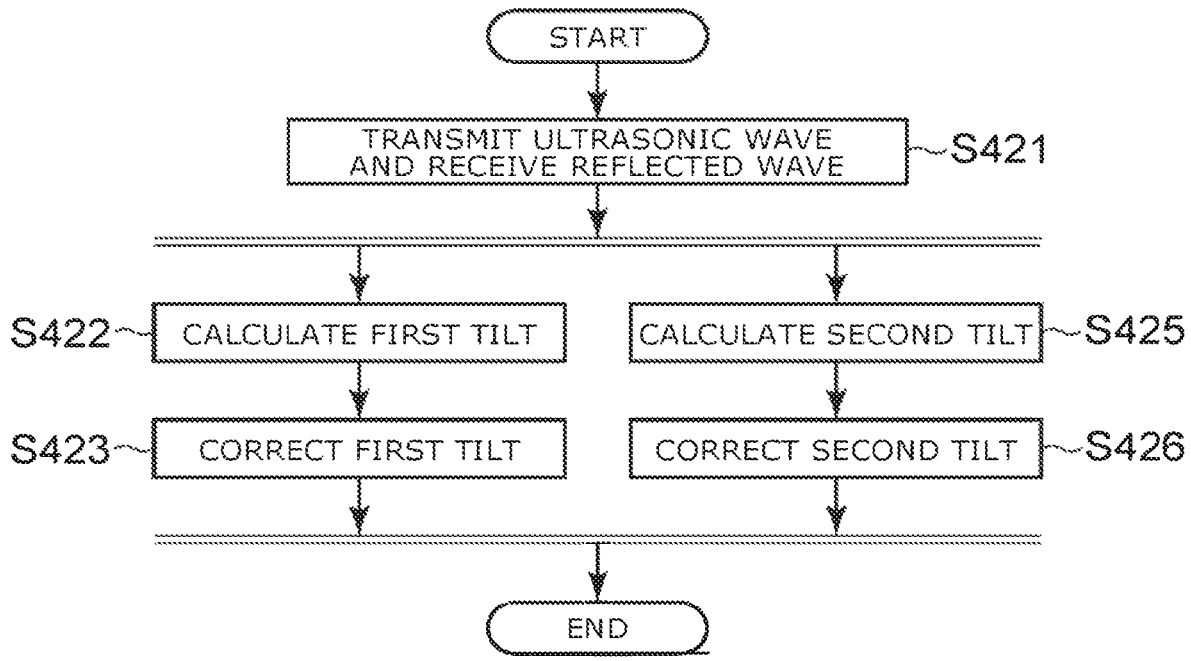

FIGS. 9A and 9B are flowcharts illustrating another method for adjusting the probe angle using the inspection system according to the embodiment.

Figure 10:
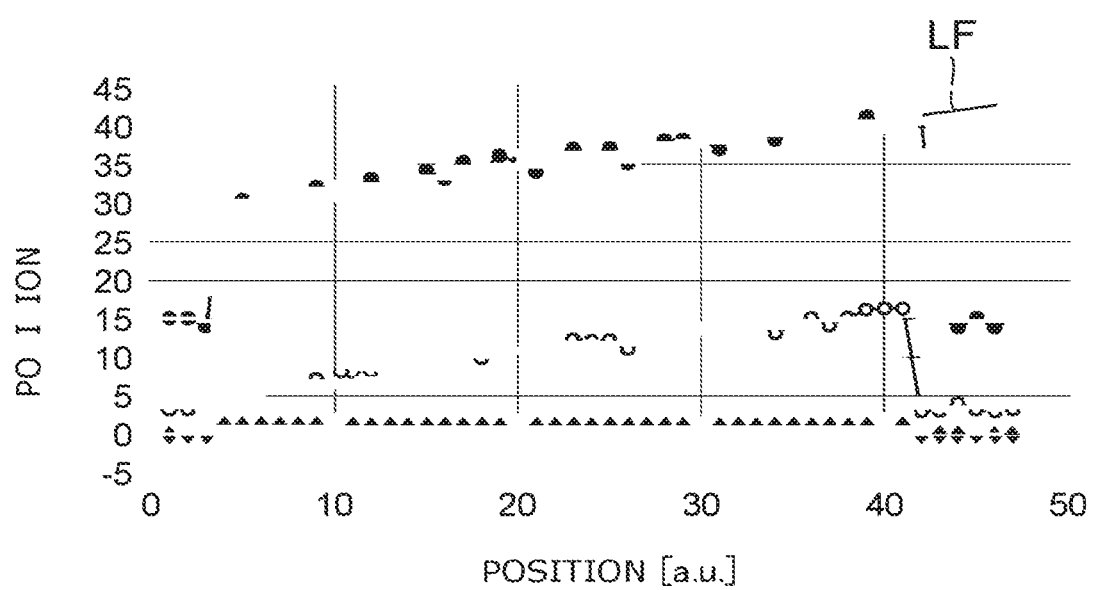
FIG. 10 is a graph illustrating data detected by the inspection system according to the embodiment.

FIG. 10 is a graph illustrating data detected by the inspection system according to the embodiment.

The flowchart illustrated in FIG. 9A will now be described.

First, similarly to step S401, the ultrasonic sensors 12 each sequentially transmit the ultrasonic wave US; and the multiple ultrasonic sensors 12 receive each of the reflected waves RW (step S421).

FIG. 10 illustrates the data detected by the multiple ultrasonic sensors 12 arranged in the first direction D1 in step S421. In FIG. 10, the vertical axis is the position in the second direction D2. The horizontal axis is the position in the first direction D1 of each of the ultrasonic sensors 12.

The controller 2 calculates a first tilt around the third direction D3 of the upper surface 5b or the bottom surface 5d from the detection result (step S422). For example, the controller 2 generates a linear function LF as illustrated in FIG. 10 using only the results determined to be the joint. The linear function LF is of the relationship between the position in the first direction D1 and the position in the second direction D2. The linear function LF is generated based on the reflected waves RW of the upper surface 5b or the bottom surface 5d. More favorably, the linear function LF is generated based on the reflected wave RW of the bottom surface 5d as illustrated in FIG. 10.

The slope of the linear function LF is taken as the first tilt. A large first tilt indicates that the tilt around the third direction D3 of the matrix sensor 11 with respect to the upper surface 5b or the bottom surface 5d is large. The controller 2 detects the direction of the first tilt and the magnitude of the first tilt and changes the angle around the third direction D3 of the probe 10 to correct the first tilt (step S423). For example, the controller 2 increases the angle to be changed as the first tilt increases. The correction of the tilt means to set the tilt to be 0 and to set the linear function LF to be substantially parallel to the horizontal axis. The tilt of the matrix sensor 11 with respect to the upper surface 5b and the bottom surface 5d can be reduced thereby.

Then, similarly to step S408, the multiple ultrasonic sensors 12 that are arranged in the third direction D3 each sequentially transmit the ultrasonic wave US; and the multiple ultrasonic sensors 12 receive each of the reflected waves RW (step S424). Similarly to step S422, the controller 2 calculates a second tilt around the first direction D1 of the upper surface 5b or the bottom surface 5d (step S425). A large second tilt indicates that the tilt around the first direction D1 of the matrix sensor 11 with respect to the upper surface 5b or the bottom surface 5d is large. Similarly to step S423, the controller 2 changes the second angle around the first direction D1 of the probe 10 to correct the second tilt (step S426).

Or, as illustrated in FIG. 9B, steps S425 and S426 may be performed in parallel with steps S422 and S423 based on the detection result obtained in step S421. According to this method, the time necessary for the angle adjustment of the probe 10 can be shortened because step S424 described above can be omitted.

According to the adjusting method, at least one of the angle around the first direction D1 or the angle around the third direction D3 of the probe 10 can be adjusted to a more appropriate value based on the detection result of performing the detection once. Therefore, the number of times the detection is performed for the angle adjustment of the probe 10 can be reduced; and the time necessary for the angle adjustment can be shortened.

Or, the method illustrated in the flowchart of FIG. 6 and the method illustrated in the flowchart of FIG. 9 may be performed in combination.

Figure 11:
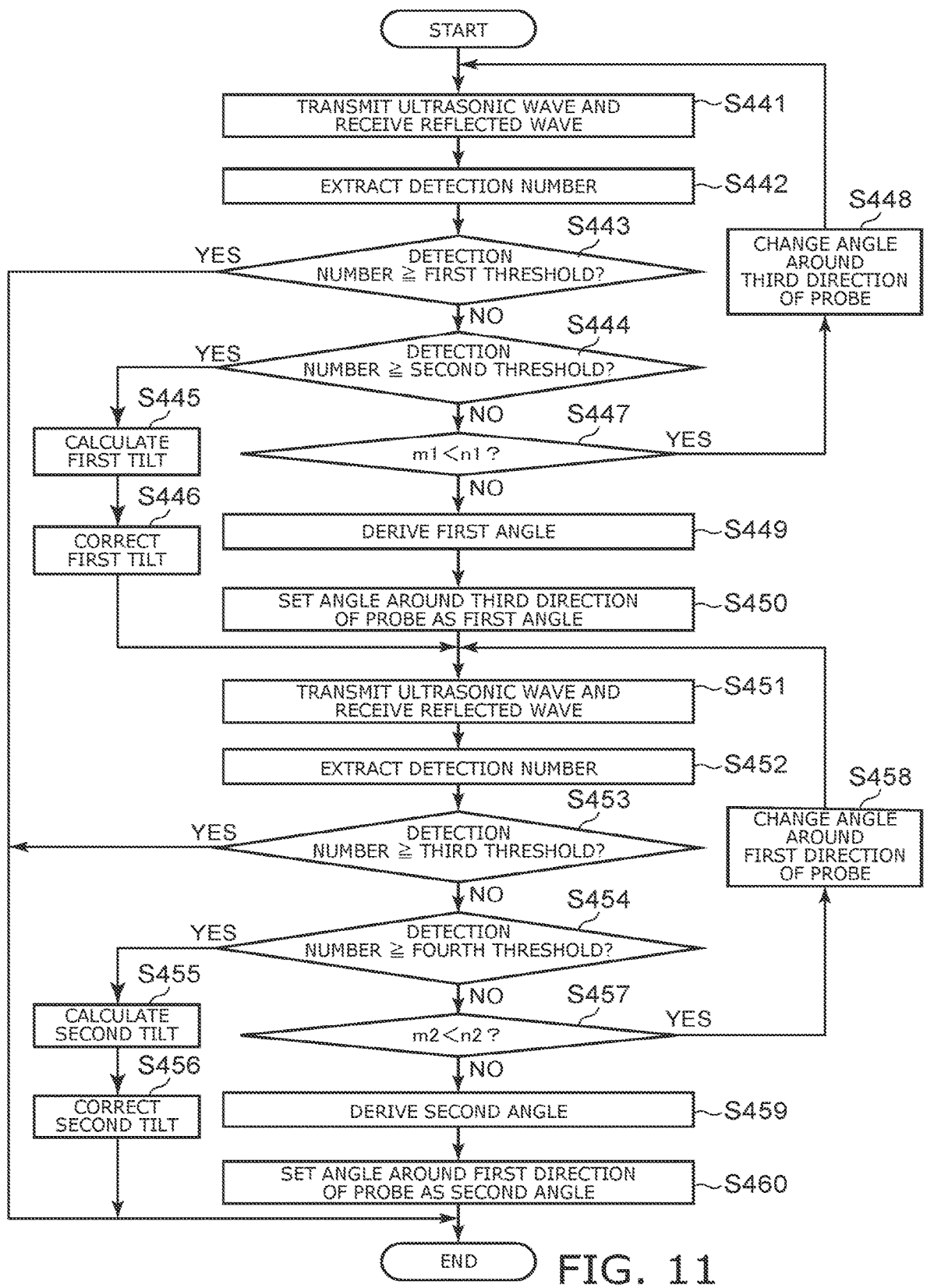
FIG. 11 is a flowchart illustrating another method for adjusting the probe angle using the inspection system according to the embodiment.

FIG. 11 is a flowchart illustrating another method for adjusting the probe angle using the inspection system according to the embodiment.

First, similarly to step S401, the multiple ultrasonic sensors 12 each sequentially transmit the ultrasonic wave US; and the multiple ultrasonic sensors 12 receive each of the reflected waves RW (step S441). The controller 2 extracts the detection number for the multiple points along the first direction D1 of the member 5 (step S442). The controller 2 determines whether or not the detection number is not less than a preset first threshold (step S443).

For example, a value of the detection number sufficient to determine that the entire weld portion 53 is sufficiently joined is set as the first threshold. In the case where the detection number is not less than the first threshold, the angle of the probe 10 is determined to be appropriate; and the angle adjustment of the probe 10 ends. In the case where the detection number is less than the first threshold, the controller 2 determines whether or not the detection number is not less than a preset second threshold (step S444).

The second threshold is less than the first threshold. A value of the detection number sufficient to calculate the first tilt is set as the second threshold. In the case where the detection number is not less than the second threshold, the first tilt is calculated similarly to the flowchart illustrated in FIG. 9 (step S445); and the angle around the third direction D3 of the probe 10 is adjusted to correct the first tilt (step S446).

In the case where the detection number is less than the second threshold, the number of times m1 that steps S441 to S444 have been performed is compared to the preset value n1 (step S447). In the case where the number of times m1 is less than the value n1, the controller 2 changes the angle around the third direction D3 of the probe 10 (step S448). Then, step S441 is re-performed. In the case where the number of times m1 is not less than the value n1, the controller 2 derives the appropriate first angle around the third direction D3 of the probe 10 from the detection result up to that time (step S449). The controller 2 sets the angle around the third direction D3 of the probe 10 as the first angle (step S450).

Then, the multiple ultrasonic sensors 12 each sequentially transmit the ultrasonic wave US; and the multiple ultrasonic sensors 12 receive each of the reflected waves RW (step S451). The controller 2 extracts the detection number for the multiple points along the third direction D3 of the member 5 (step S452). The controller 2 determines whether or not the detection number is not less than a preset third threshold (step S453).

Similarly to the first threshold, for example, a value of the detection number sufficient to determine that the entire weld portion 53 is sufficiently joined is set as the third threshold. In the case where the detection number is not less than the third threshold, the angle of the probe 10 is determined to be appropriate; and the angle adjustment of the probe 10 ends. In the case where the detection number is less than the third threshold, the controller 2 determines whether or not the detection number is not less than a preset fourth threshold (step S454).

The fourth threshold is less than the third threshold. A value of the detection number sufficient to calculate the second tilt is set as the fourth threshold. In the case where the detection number is not less than the fourth threshold, the second tilt is calculated similarly to the flowchart illustrated in FIG. 9 (step S455); and the angle around the first direction D1 of the probe 10 is adjusted to correct the second tilt (step S456).

In the case where the detection number is less than the fourth threshold, the number of times m2 that steps S451 to S454 have been performed is compared to the preset value n2 (step S457). In the case where the number of times m2 is less than the value n2, the controller 2 changes the angle around the first direction D1 of the probe 10 (step S458). Then, step S451 is re-performed. In the case where the number of times m2 is not less than the value n2, the controller 2 derives the appropriate second angle around the first direction D1 of the probe 10 from the detection result up to that time (step S459). The controller 2 sets the angle around the third direction D3 of the probe 10 as the second angle (step S460).

According to this method, compared to the methods illustrated in FIG. 6 and FIG. 9, it is possible to set the angle of the probe 10 to a more appropriate value.

Step S451 may be omitted from the flowchart illustrated in FIG. 11. In such a case, step S452 is performed based on the detection result acquired in step S441. According to this method, the time necessary for the angle adjustment of the probe 10 can be shortened.

The embodiments of the invention include the following programs.

A program for adjusting an angle of a probe contacting a weld portion by moving in a second direction crossing a first direction, the probe including multiple ultrasonic sensors arranged in the first direction, the program causing a controller to
  detect a joint and a non-joint at multiple points along the first direction of the weld portion based on multiple reflected waves received by transmitting an ultrasonic wave toward the weld portion from each of the multiple ultrasonic sensors, and
  adjust the angle of the probe around a third direction perpendicular to the first direction and crossing the second direction based on a number of the joints or the non-joints detected for the multiple points.

A program for adjusting an angle of a probe contacting a weld portion by moving in a second direction crossing a first direction, the probe including multiple ultrasonic sensors arranged in the first direction, the program causing a controller to
  detect, at multiple points along the first direction of a first surface of the weld portion, a position in the second direction of each of the multiple points based on the multiple reflected waves,
  calculate a first tilt of the first surface around a third direction perpendicular to the first direction and crossing the second direction from a detection result of at least a portion of the multiple positions, and
  adjust an angle of the probe around the third direction to correct the first tilt.

According to the inspection system 100, the control unit, or the control method according to the embodiments described above, the angle of the probe 10 can be adjusted to a more appropriate value. Similarly, the angle of the probe 10 can be adjusted to a more appropriate value by using a program or a storage medium in which the program is stored to cause the controller 2 to perform the control method described above.

The embodiments may include the following aspects.
(Aspect 1)
  A control method, comprising:
    causing a probe to contact a weld portion in a second direction crossing a first direction, the probe including a plurality of ultrasonic sensors arranged in the first direction;
    receiving a reflected wave by transmitting an ultrasonic wave toward the weld portion from each of the plurality of ultrasonic sensors;
    detecting, at a plurality of points along the first direction of a first surface of the weld portion, a position in the second direction of each of the plurality of points based on the plurality of reflected waves;
    calculating a first tilt of the first surface around a third direction from a detection result of at least a portion of the plurality of positions, the third direction being perpendicular to the first direction and crossing the second direction; and
    adjusting an angle of the probe around the third direction to correct the first tilt.
(Aspect 2)
  A storage medium storing a program for adjusting an angle of a probe, the probe contacting a weld portion by moving in a second direction crossing a first direction, the probe including a plurality of ultrasonic sensors arranged in the first direction,
    the program causing a controller to
      detect, at a plurality of points along the first direction of a first surface of the weld portion, a position in the second direction of each of the plurality of points based on the plurality of reflected waves,
      calculate a first tilt of the first surface around a third direction from a detection result of at least a portion of the plurality of positions, the third direction being perpendicular to the first direction and crossing the second direction, and
      adjust an angle of the probe around the third direction to correct the first tilt.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:
1. An inspection method, comprising:
  causing a probe to transmit an ultrasonic wave toward a weld portion and to receive a reflected wave, the probe including a plurality of ultrasonic sensors arranged in a first direction, the ultrasonic wave being transmitted along a second direction crossing the first direction;
  adjusting an angle of the probe around a third direction based on the reflected wave, the third direction being perpendicular to the first direction and crossing the second direction; and
  inspecting the weld portion after adjusting the angle of the probe.

2. The inspection method according to claim 1, wherein in inspecting the weld portion,
the probe is caused to transmit an other ultrasonic wave toward the weld portion at the adjusted angle and to receive an other reflected wave, and
it is determined whether or not the weld portion is joined using the other reflected wave.

3. The inspection method according to claim 2, wherein in inspecting the weld portion,
a peak of an intensity of the other reflected wave is detected at each point of a detection area, the detection area including the weld portion, and
a joint or a non-joint is detected for each point of the detection area based on the detected peak.

4. The inspection method according to claim 1, wherein one of the plurality of ultrasonic sensors transmits the ultrasonic wave toward the weld portion and the plurality of ultrasonic sensors receives the reflected wave.

5. The inspection method according to claim 1, wherein the plurality of ultrasonic sensors each sequentially transmit the ultrasonic wave toward the weld portion and the plurality of ultrasonic sensors receives the reflected wave multiple times.

6. The inspection method according to claim 1, wherein the ultrasonic wave is transmitted to the weld portion via a couplant.

7. The inspection method according to claim 1, wherein the plurality of ultrasonic sensors is arranged in the first direction and the third direction.

8. A control unit, being configured to perform:
causing a probe to transmit an ultrasonic wave toward a weld portion and receive a reflected wave, the probe including a plurality of ultrasonic sensors arranged in a first direction, the ultrasonic wave being transmitted along a second direction crossing the first direction;
causing adjusting an angle of the probe around a third direction based on the reflected wave, the third direction being perpendicular to the first direction and crossing the second direction; and
inspecting the weld portion after adjusting the angle of the probe.

9. The control unit according to claim 8, wherein in inspecting the weld portion,
the control causes the probe to transmit an other ultrasonic wave toward the weld portion at the adjusted angle and to receive an other reflected wave, and
the control unitf determines whether or not the weld portion is joined using the other reflected wave.

10. The control unit according to claim 8, wherein in inspecting the weld portion,
the control unit detects a peak of an intensity of the other reflected wave at each point of a detection area, the detection area including the weld portion, and
the control unit detects a joint or a non-joint for each point of the detection area based on the detected peak.

11. The control unit according to claim 8, wherein the control unit causes one of the plurality of ultrasonic sensors to transmit the ultrasonic wave toward the weld portion and causes the plurality of ultrasonic sensors to receive the reflected wave.

12. The control unit according to claim 8, wherein the control unit causes the plurality of ultrasonic sensors to each sequentially transmit the ultrasonic wave toward the weld portion and causes the plurality of ultrasonic sensors to receive the reflected wave multiple times.

13. The control unit according to claim 8, wherein the ultrasonic wave is transmitted to the weld portion via a couplant.

14. The control unit according to claim 8, wherein the plurality of ultrasonic sensors is arranged in the first direction and the third direction.

15. A non-transitory computer-readable storage medium, storing a program, the program causing a computer to perform the inspection method according to claim 1.

* * * * *